(12) United States Patent
Turner et al.

(10) Patent No.: US 10,584,739 B2
(45) Date of Patent: Mar. 10, 2020

(54) CENTRIFUGAL PUMP ASSEMBLIES HAVING AN AXIAL FLUX ELECTRIC MOTOR AND METHODS OF ASSEMBLY THEREOF

(71) Applicants: Regal Beloit America, Inc., Beloit, WI (US); Regal Beloit Australia Pty Ltd., Rowville, Victoria (AU)

(72) Inventors: Matthew J. Turner, Rowville (AU); Greg Heins, Rowville (AU); Mark Thiele, Cape Woolamai (AU); Jason Jon Kreidler, Sheboygan, WI (US)

(73) Assignees: REGAL BELOIT AUSTRALIA PTY LTD, Rowville (AU); REGAL BELOIT AMERICA, INC., Beloit, WI (US)

(*) Notice: Subject to any disclaimer, the term of this patent is extended or adjusted under 35 U.S.C. 154(b) by 400 days.

(21) Appl. No.: 15/418,171

(22) Filed: Jan. 27, 2017

(65) Prior Publication Data
US 2018/0216624 A1 Aug. 2, 2018

(51) Int. Cl.
*F16C 17/02* (2006.01)
*F04D 29/047* (2006.01)
(Continued)

(52) U.S. Cl.
CPC .............. *F16C 17/02* (2013.01); *F04D 13/06* (2013.01); *F04D 13/0666* (2013.01);
(Continued)

(58) Field of Classification Search
CPC ........ F16C 17/02; F16C 17/026; F16C 17/10; F16C 17/102; F16C 17/105;
(Continued)

(56) References Cited

U.S. PATENT DOCUMENTS 3,671,137 A 6/1972 Ball
4,277,111 A 7/1981 Gray et al.
(Continued)

FOREIGN PATENT DOCUMENTS

JP 2004011525 A 1/2004
WO 2000037804 A1 6/2000

OTHER PUBLICATIONS

WW, Bill, and Instructables. "Determine How Magnetic Field Varies With Distance." Instructables.conn, Instructables, Oct. 25, 2017; 7 pp.
(Continued)

*Primary Examiner* — James Pilkington
(74) *Attorney, Agent, or Firm* — Armstrong Teasdale LLP

(57) ABSTRACT

A hydrodynamic bearing assembly includes a first stationary component, a shaft coupled to the first stationary component, and a second stationary component coupled to the shaft opposite the first stationary component. The hydrodynamic bearing assembly also includes a rotating component coupled to the shaft between the first stationary component and the second stationary component. The rotating component includes a first end surface including a first diameter and an opposing second end surface including a second diameter that is greater than the first diameter.

16 Claims, 9 Drawing Sheets

(51) Int. Cl.
*F04D 29/06* (2006.01)
*F04D 13/06* (2006.01)

(52) U.S. Cl.
CPC ....... *F04D 29/0473* (2013.01); *F04D 29/061* (2013.01); *F16C 2360/44* (2013.01)

(58) Field of Classification Search
CPC .......... F16C 2360/44–46; F04D 13/06; F04D 13/0666; F04D 29/0473; F04D 29/061
See application file for complete search history.

(56) References Cited

U.S. PATENT DOCUMENTS

| | | | |
|---|---|---|---|
| 4,319,790 A | 3/1982 | Thomson |
| 4,615,662 A | 10/1986 | Laing |
| 4,644,202 A | 2/1987 | Kroy et al. |
| 4,806,080 A | 2/1989 | Mizobuchi et al. |
| 4,867,633 A | 9/1989 | Gravelle |
| 5,125,754 A | 6/1992 | Ide |
| 5,163,812 A | 11/1992 | Klaus |
| 5,250,863 A | 10/1993 | Brandt |
| 5,358,339 A | 10/1994 | Konno et al. |
| 5,393,145 A | 2/1995 | Ide |
| 5,407,331 A | 4/1995 | Atsumi |
| 5,767,606 A | 6/1998 | Bresolin |
| 5,911,512 A * | 6/1999 | Lee .................. F16C 17/04 384/112 |
| 5,939,813 A | 8/1999 | Schob |
| 5,951,169 A | 9/1999 | Oklejas et al. |
| 5,997,261 A | 12/1999 | Kershaw et al. |
| 6,010,246 A * | 1/2000 | Gomyo ............ F16C 17/026 384/115 |
| 6,012,909 A | 1/2000 | Sloteman et al. |
| 6,036,435 A | 3/2000 | Oklejas |
| 6,071,093 A | 6/2000 | Hart |
| 6,132,186 A | 10/2000 | Cooper et al. |
| 6,201,329 B1 | 3/2001 | Chen |
| 6,271,612 B1 * | 8/2001 | Tanaka ............. F16C 17/026 310/90 |
| 6,293,769 B1 | 9/2001 | Radermacher et al. |
| 6,422,838 B1 | 7/2002 | Sloteman |
| 6,439,845 B1 | 8/2002 | Veres |
| 6,505,970 B2 | 1/2003 | Takahashi et al. |
| 7,265,939 B2 * | 9/2007 | Kuwajima ............. F16C 17/10 360/98.07 |
| 7,431,688 B2 | 10/2008 | Wampler et al. |
| 7,534,725 B2 | 5/2009 | Shen et al. |
| 8,303,268 B2 | 11/2012 | Werson et al. |
| 8,353,687 B2 | 1/2013 | Werson et al. |
| 8,487,378 B2 | 7/2013 | Goto et al. |
| 8,729,634 B2 | 5/2014 | Shen et al. |
| 8,826,213 B1 | 9/2014 | Ho et al. |
| 8,852,673 B2 | 10/2014 | Laing et al. |
| 8,887,106 B2 | 11/2014 | Ho et al. |
| 9,029,263 B1 | 5/2015 | Kim et al. |
| 9,863,430 B2 | 1/2018 | Lee et al. |
| 10,323,654 B2 | 6/2019 | Zhang et al. |
| 2002/0052113 A1 | 5/2002 | Khan et al. |
| 2002/0094281 A1 | 7/2002 | Khanwilkar et al. |
| 2005/0147512 A1 | 7/2005 | Chen et al. |
| 2006/0247486 A1 | 11/2006 | Mendler |
| 2010/0272592 A1 | 10/2010 | Chien et al. |
| 2011/0238172 A1 | 9/2011 | Akdis et al. |
| 2014/0282326 A1 | 9/2014 | Chen et al. |
| 2014/0322020 A1 | 10/2014 | Wampler et al. |
| 2014/0377101 A1 | 12/2014 | Muller |
| 2015/0017031 A1 | 1/2015 | Blad |
| 2015/0162206 A1 | 6/2015 | Liao et al. |
| 2016/0131141 A1 | 5/2016 | Sato et al. |
| 2016/0247685 A1 | 8/2016 | Chen et al. |

OTHER PUBLICATIONS

Simanek, Donald E., "Discussion of the Classic Magnetic Motor"; Lock Haven University; available at https://lockhaven.edu/~dsimanek/museum/cheng2.htm; last visited Feb. 19, 2019; 8 pp.
"Open vs. Closed Impellers"; McNally Institute; available at http://www.mcnallyinstitute.com/14-html/14-02.htm; last visited Feb. 19, 2019; 8 pp.
PCT International Search Report and Written Opinion for related application PCT/US18/15446 dated May 25, 2018; 13 pp.
PCT International Search Report and Written Opinion for related application PCT/US18/15455 dated May 25, 2018; 13 pp.

* cited by examiner

CENTRIFUGAL PUMP ASSEMBLIES HAVING AN AXIAL FLUX ELECTRIC MOTOR AND METHODS OF ASSEMBLY THEREOF

BACKGROUND

The field of the disclosure relates generally to centrifugal pump assemblies, and more specifically, to centrifugal pump assemblies that include an axial flux electric motor coupled to an impeller.

At least some known centrifugal pumps include an impeller for channeling a fluid through the pump. The impeller is coupled to a shaft via a hydrostatic bearing, which is coupled to a rotor of an electric motor such that rotation of the rotor causes rotation of the bearing and the impeller. In at least some known electric motors, a separate pump is used to deliver a pressurized fluid flow required for operation of the hydrostatic bearing. An additional pump increases both the complexity and cost of the pump system, which may inhibit the use of hydrostatic bearings in cost sensitive applications.

Furthermore, at least some known centrifugal pumps include hydrodynamic bearings. When designing a hydrodynamic bearing there are a number of factors to consider. One of them is the ability of the bearing to hydro dynamically 'lift' in operation and separate the rotating bearing component from the stationary bearing component. It is critical the bearing 'lifts' to ensure correct operation. If the bearing does not 'lift' there will be large friction between the two bearing materials causing large friction torque resistance, drag torque resistance and material ware. To ensure bearing lift, the bearing is designed to have a pressure velocity (PV) factor to fall within a predetermined range. The PV factor is based on the velocity of the rotating component and the coefficient of friction between the rotating bearing component and the stationary bearing component. However, at least some known rotating bearing components are flat disks, leading to a velocity differential between the inner diameter and the outer diameter of the disk. This velocity differential leads to a wide range of PV factors, at least some of which may be outside the desired range. Operational of the hydrodynamic bearing outside the desired PV factor range may lead to inefficient operation of the pump assembly and/or to a shortened service lifetime of the bearing components.

BRIEF DESCRIPTION

In one aspect, an electric motor assembly is provided. The electric motor assembly includes a bearing assembly including a rotating component and at least one stationary component. The electric motor assembly also includes an impeller coupled to the rotating component. The impeller includes an inlet and an outlet and is configured to direct a fluid between the inlet and the outlet. The electric motor assembly also includes a rotor assembly directly coupled to the impeller. A fluid flow channel is defined between the rotating component and the at least one stationary component. The flow channel includes a first end proximate the impeller outlet and a second end proximate the impeller inlet.

In another aspect, a pump assembly is provided. The pump assembly includes a pump housing and a motor housing coupled to the pump housing. The pump assembly also includes an electric motor assembly including a bearing assembly including a rotating component and at least one stationary component. The electric motor assembly also includes an impeller coupled to the rotating component. The impeller includes an inlet and an outlet and is configured to direct a fluid between the inlet and the outlet. The electric motor assembly also includes a rotor assembly directly coupled to the impeller. A fluid flow channel is defined between the rotating component and the at least one stationary component. The flow channel includes a first end proximate the impeller outlet and a second end proximate the impeller inlet.

In yet another aspect, a method of assembling a pump assembly is provided. The method includes providing a bearing assembly including a rotating component and at least one stationary component. The method also includes coupling an impeller to the rotating component, wherein the impeller includes an inlet and an outlet and is configured to direct a fluid therebetween. A rotor assembly is directly coupled to the impeller. The method also includes defining a fluid flow channel between the rotating component and the at least one stationary component. The flow channel includes a first end proximate the impeller outlet and a second end proximate the impeller inlet.

In one aspect, a hydrodynamic bearing assembly is provided. The hydrodynamic bearing assembly includes a first stationary component, a shaft coupled to the first stationary component, and a second stationary component coupled to the shaft opposite the first stationary component. The hydrodynamic bearing assembly also includes a rotating component coupled to the shaft between the first stationary component and the second stationary component. The rotating component includes a first end surface including a first diameter and an opposing second end surface including a second diameter that is greater than the first diameter.

In another aspect, a pump assembly is provided. The pump assembly includes a hydrodynamic bearing assembly includes a first stationary component, a shaft coupled to the first stationary component, and a second stationary component coupled to the shaft opposite the first stationary component. The hydrodynamic bearing assembly also includes a rotating component coupled to the shaft between the first stationary component and the second stationary component. The rotating component includes a first end surface including a first diameter and an opposing second end surface including a second diameter that is greater than the first diameter. The pump assembly also includes an impeller coupled to the rotating component and a rotor assembly directly coupled to the impeller.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
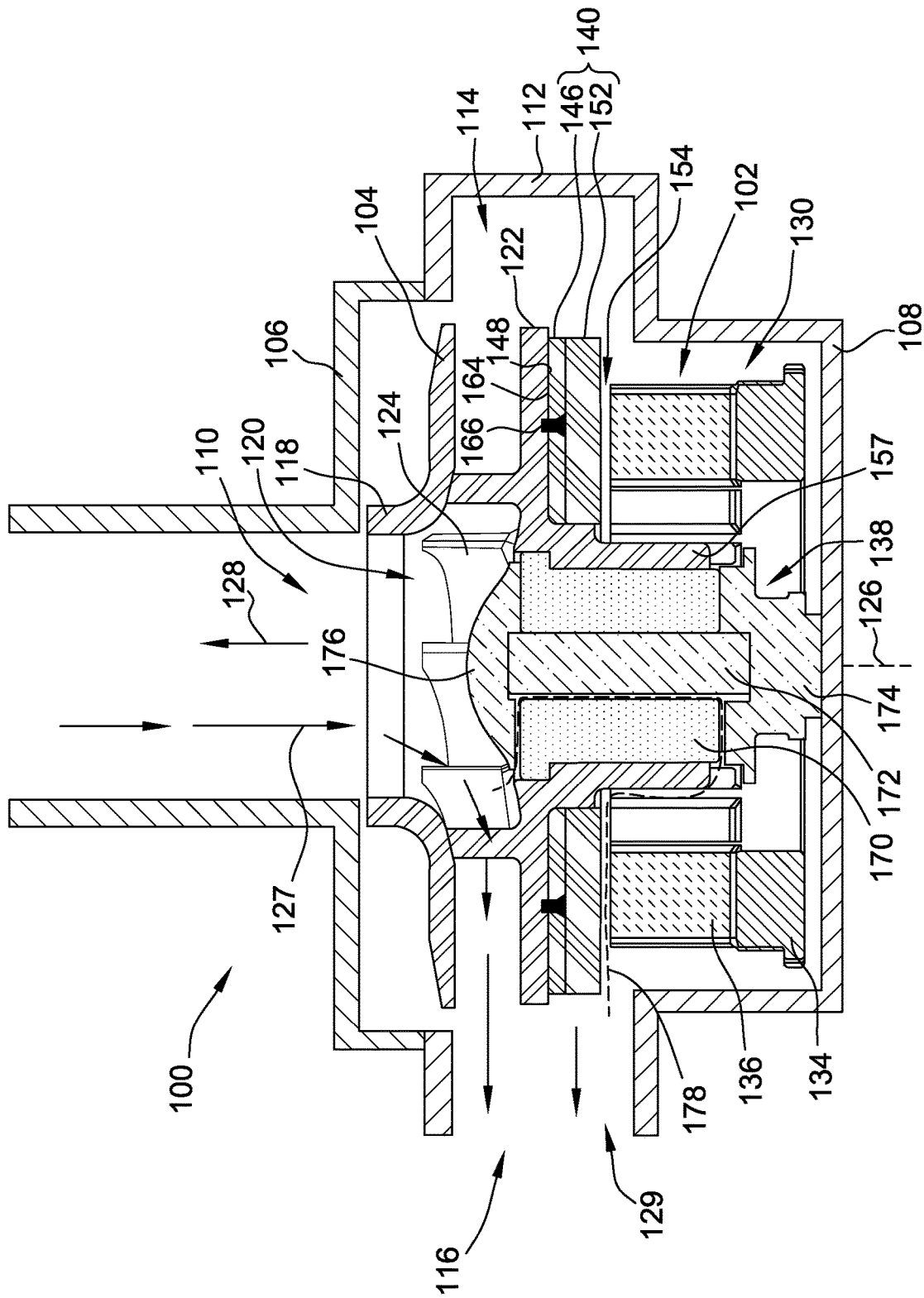
FIG. 1 is a cross-sectional view of an exemplary centrifugal pump assembly including an impeller, an electric motor, and a hydrodynamic bearing.
Figure 2:
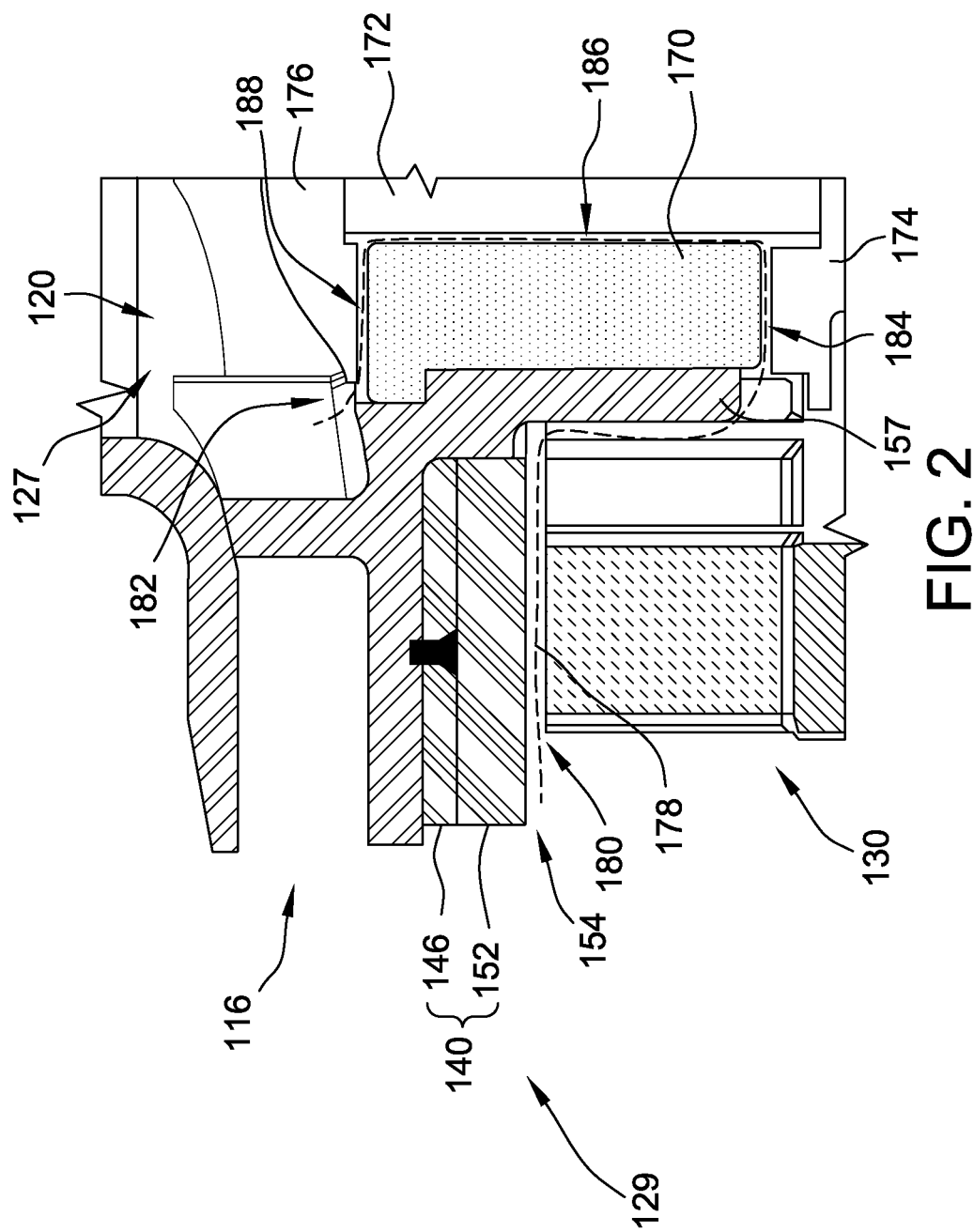
FIG. 2 is an enlarged cross-sectional view of a portion of the centrifugal pump assembly bounded by box 2-2 in FIG. 1 illustrating an exemplary flow channel through the centrifugal pump assembly.

FIG. 1 is a cross-sectional view of an exemplary centrifugal pump assembly 100 illustrating an axial flux electric motor assembly 102, an impeller 104, and a pump housing 106. FIG. 2 is an enlarged cross-sectional view of electric motor assembly 102 and impeller 104 with pump housing 106 removed for clarity. In the exemplary embodiment, pump assembly 100 includes pump housing 106 and a motor housing 108. Pump housing 106 encloses impeller 104 and at least a portion of motor assembly 102, while motor housing 108 encloses motor assembly 102. Pump housing 106 includes a fluid inlet 110, a scroll wall 112 defining a portion of a fluid flow cavity 114, and a fluid outlet 116. In operation, fluid flows through inlet 110 and is directed through channel 114 around wall 112 until the fluid exits pump 100 through housing outlet 116.

In the exemplary embodiment, impeller 104 is positioned within pump housing 106 and includes an inlet ring 118 that defines an inlet opening 120. Impeller 104 also includes a rear plate 122 and a plurality of blades 124 coupled between inlet ring 118 and rear plate 122. As described in further detail herein, rear plate 122 of impeller 102 is coupled directly to motor assembly 102 such that motor assembly 102 is configured to rotate impeller 102 about a rotational axis 126. In operation, motor 102 rotates impeller 104 about axis 126 to draw fluid in an axial direction into pump housing 106 through housing inlet 110. The fluid is channeled through inlet opening 120 in inlet ring 118 and turned by blades 124 within channel 114 to direct the fluid along wall 112 and radially through housing outlet 116. The amount of fluid moved by pump assembly 100 increases as impeller 104 speed increases such that impeller 104 generates high velocity fluid flow that is exhausted from outlet 116.

Impeller 104 imparts kinetic energy into the pumped fluid as it rotates that causes the fluid to pressurize. That is, an area 127 of negatively pressurized fluid exists upstream of impeller 104, and more specifically, upstream of impeller blades 124 proximate inlets 110 and 120. Correspondingly, an area 129 of positively pressurized fluid exists downstream of impeller 104 proximate outlet 116 of housing 106. As such, rotation of impeller 104 causes a pressure differential across impeller 104. In the exemplary embodiment, the negatively pressurized fluid imparts an axial suction force 128 on impeller 104. Axial force 128 acts in an axial direction away from motor assembly 102 through pump housing inlet 110. As the speed of impeller 104 increases, both the pressure of the fluid and the resulting axial suction force 128 also increase correspondingly. That it, the magnitude of axial suction force 128 is based on the rotational speed of impeller 104.

In the exemplary embodiment, motor assembly 102 includes a stator assembly 130 including a magnetic stator core 134 and a plurality of conductor coils 136 positioned within motor housing 108. Motor assembly 102 also includes a bearing assembly 138 and a rotor assembly 140. Each conductor coil 136 includes an opening (not shown) that closely conforms to an external shape of one of a plurality of stator core teeth (not shown) such that each stator tooth is configured to be positioned within a conductor coil 136. Motor assembly 102 may include one conductor coil 136 per stator tooth or one conductor coil 136 positioned on every other tooth.

In the exemplary embodiment, a variable frequency drive (not shown) provides a signal, for example, a pulse width modulated (PWM) signal, to motor 102. In an alternative embodiment, motor 102 may include a controller (not shown) coupled to conductor coils 136 by wiring. The controller is configured to apply a voltage to one or more of conductor coils 136 at a time for commutating conductor coils 136 in a preselected sequence to rotate rotor assembly 140 about axis 126.

Rotor assembly 140 is positioned within pump housing 106 proximate cavity 114 and includes a back iron or rotor disk 146 having at least a first axial surface 148. In the exemplary embodiment, rotor assembly 140 also includes a plurality of permanent magnets 152 coupled directly to rotor disk 146. In another embodiment, rotor assembly 140 includes a magnet retainer (not shown) coupled to rotor disk 146 opposite impeller 104, and permanent magnets 152 are coupled to the magnet retainer.

Figure 3:
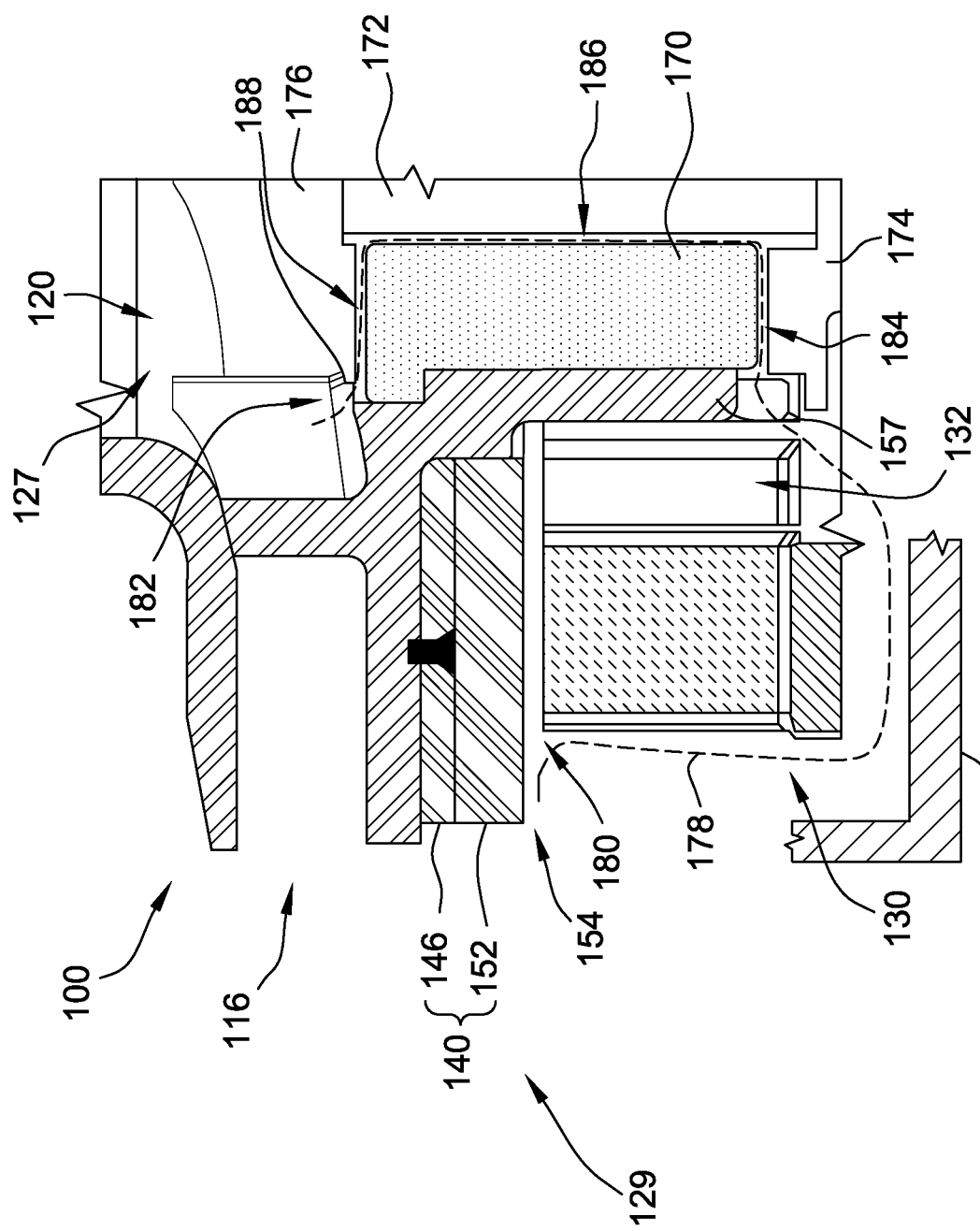
FIG. 3 is an enlarged cross-sectional view of a portion of the centrifugal pump assembly shown in FIG. 1 illustrating an alternative flow channel through the centrifugal pump assembly.

As best shown in FIG. 1, impeller 104 is directly coupled to rotor assembly 140 opposite stator assembly 130 such that impeller 104 contacts rotor assembly 140 to enable rotation of impeller 104 and rotor assembly 140 about axis 126. As used herein, the term "directly" is meant to describe that rotor assembly 140 is coupled to impeller 104 without any intermediate structure positioned therebetween to separate rotor assembly 140 from impeller 104. More specifically, rotor disk 146 is directly coupled to impeller 104. Even more specifically, rotor disk 146 is directly coupled to rear plate 122 of impeller 104. In one embodiment, axial surface 148 of rotor disk 146 is coupled to and directly contacts an axial surface 164 of rear plate 122 in a face-to-face relationship. In the exemplary embodiment, and as shown in FIG. 3, rotor disk 146 is coupled to impeller back plate 122 using a plurality of fasteners 166. In another embodiment, rotor assembly 140 is integrally formed with impeller 104. More specifically, rotor disk 146 is integrally formed with rear plate 122 of impeller 104 such that rotor disk 146 and rear plate 122 form a single, monolithic component. Generally, rotor assembly 140 and impeller 104 are directly coupled together using any attachment means that facilitates operation of pump assembly 100 as described herein.

In the exemplary embodiment, rotor assembly 140 is positioned adjacent stator assembly 130 to define an axial gap 154 therebetween. A liner (not shown) surrounds stator assembly 130 to prevent core 134 and coils 136 from being exposed to the fluid within housings 106 and 108. As described above, voltage is applied to coils 136 in sequence to cause rotation of rotor assembly 140. More specifically, coils 136 control the flow of magnetic flux between magnetic stator core 134 and permanent magnets 152. Magnets 152 are attracted to magnetic stator core 134 such that an axial magnetic force (not shown) is ever-present across gap 154. As such, stator core 134 of stator assembly 130 imparts the axial magnetic force to rotor assembly 140 in an axial direction away from impeller 104. More specifically, the axial magnetic force acts in a direction opposite of axial suction force 128 of impeller 104. As the size of axial gap 154 decreases, the axial magnetic force between stator assembly 130 and rotor assembly 140 increases. That is, the magnitude of the axial magnetic force is based on a length of axial gap 154.

In the exemplary embodiment, impeller 104 includes a cylindrical extension 157 that extends axially from rear plate 122 towards motor housing 108. More specifically, extension 157 extends axially passed rotor assembly 140 and into an opening 132 defined by stator core 134 to at least partially axially overlap with stator assembly 130. Furthermore, extension 157 is coupled to a rotating component 170 of bearing assembly 138. Rotating component 170 circumscribes a stationary shaft 172 of bearing assembly 138 and is positioned axially between a first stationary component 174 and a second stationary component 176 of bearing assembly 138. In the exemplary embodiment, bearing assembly 138 includes a hydrodynamic bearing.

As best shown in FIG. 2, a fluid flow channel 178 is defined between rotating component 170 and stationary components 172, 174, and 176. Channel 178 includes a first end 180 proximate impeller outlet 116 and a second end 182 proximate impeller inlet 120. In the exemplary embodiment, first end 180 is an inlet of channel 178 and second end 182 is an outlet of channel 178. Furthermore, first end 180 is located on a first axial side of rotor assembly 140 and second end 182 is located on an opposite second axial side of rotor assembly 140. As described in further detail below, inlet end 180 of channel 178 corresponds to outlet 116 of impeller 104, and outlet end 182 of channel 178 corresponds to inlet 120 of impeller 104. Furthermore, inlet end 180 of channel 178 corresponds to positive pressure side 129 of impeller 104, and outlet end 182 of channel 178 corresponds to negative pressure side 127 of impeller 104. In the exemplary embodiment, the pressure differential across impeller 104 between areas 127 and 129 causes fluid to flow through channel 178 from channel inlet 180 to channel outlet 182 to provide working fluid for bearing assembly 138.

As shown in FIG. 2, a portion of channel 178 extends radially along axial gap 154 between rotor assembly 140 and stator assembly 130 before following impeller extension 157 and then encountering bearing assembly 138. In the exemplary embodiment, channel 178 includes a first radial portion 184 between rotating component 170 and first stationary component 174, an axial portion 186 between rotating component 170 and stationary shaft 172, and a second radial portion 188 between rotating component 170 and second stationary component 176 such that first radial portion 184, axial portion 186, and second radial portion 188 are in serial flow communication. Additionally, each of first stationary component 174, second stationary component 176, and stationary shaft 172 include a groove (not shown) formed therein to enable the presence of fluid between stationary components 174, 172, and 176 and rotating component 170 at motor start-up. First radial portion 184, axial portion 186, and second radial portion 188 of flow channel 178 extend along the grooves in stationary components 174, 172, and 176, respectively.

In operation, conductor coils 136 coupled to stator core 134 are energized in a chronological sequence that provides an axial magnetic field which moves clockwise or counterclockwise around stator core 134 depending on the predetermined sequence or order in which conductor coils 136 are energized. This moving magnetic field intersects with the flux field created by the plurality of permanent magnets 152 to cause rotor assembly 140 to rotate about axis 126 relative to stator assembly 130 in the desired direction. As described herein, because rotor disk 146 is directly coupled to impeller 104, rotation of rotor disk 146 causes rotation of impeller 104, which pressurizes the fluid flowing through impeller 104 from inlet 120 to outlet 116. The resulting pressure differential across impeller 104, and rotor assembly 140, and locating channel inlet 180 on positive pressure side 129 and channel outlet 182 on negative pressure side 127 of impeller 104 forces fluid through flow channel 178. The fluid through channel 178 pressurizes bearing assembly 138 and overcomes the axial magnetic force between stator assembly 130 and rotor assembly 140 to enable operation of assembly 100 as described herein. Accordingly, the pressure differential across impeller 104 and rotor assembly 140 enables pressurization of bearing assembly 138 without requiring a separate pump.

FIG. 3 is an enlarged cross-sectional view of a portion of centrifugal pump assembly 100 shown in FIG. 1 illustrating an alternative flow channel 190 through centrifugal pump assembly 100. Flow channel 190 is substantially similar to flow channel 178 in operation and composition, with the exception that flow channel 190 extends radially inward along an axially outer surface of stator assembly 130 rather than between rotor assembly 140 and stator assembly 130. As such, components shown in FIG. 3 are labeled with the same reference numbers used in FIGS. 1 and 2.

As shown in FIG. 3, a portion of channel 190 extends axially between the outer surface of stator assembly 130 and motor housing 108 before curving around stator assembly 130 to extend radially between an axial end surface of stator assembly 130 and motor housing 108. Flow channel 190 then extends through opening 132 defined by stator core 134 then encountering bearing assembly 138. Similar to flow channel 178, flow channel 190 includes first radial portion 184 between rotating component 170 and first stationary component 174, axial portion 186 between rotating component 170 and stationary shaft 172, and second radial portion 188 between rotating component 170 and second stationary component 176 such that first radial portion 184, axial portion 186, and second radial portion 188 are in serial flow communication. Additionally, each of first stationary component 174, second stationary component 176, and stationary shaft 172 include a groove (not shown) formed therein to enable the presence of fluid between stationary components 174, 172, and 176 and rotating component 170 at motor start-up. First radial portion 184, axial portion 186, and second radial portion 188 of flow channel 178 extend along the grooves in stationary components 174, 172, and 176, respectively.

In operation, conductor coils 136 coupled to stator core 134 are energized in a chronological sequence that provides an axial magnetic field which moves clockwise or counterclockwise around stator core 134 depending on the predetermined sequence or order in which conductor coils 136 are energized. This moving magnetic field intersects with the flux field created by the plurality of permanent magnets 152 to cause rotor assembly 140 to rotate about axis 126 relative to stator assembly 130 in the desired direction. As described herein, because rotor disk 146 is directly coupled to impeller 104, rotation of rotor disk 146 causes rotation of impeller 104, which pressurizes the fluid flowing through impeller 104 from inlet 120 to outlet 116. The resulting pressure differential across impeller 104, and rotor assembly 140, and locating channel inlet 180 on positive pressure side 129 and channel outlet 182 on negative pressure side 127 of impeller 104 forces fluid through flow channel 190. The fluid through channel 190 pressurizes bearing assembly 138 and overcomes the axial magnetic force between stator assembly 130 and rotor assembly 140 to enable operation of assembly 100 as described herein. Accordingly, the pressure differential across impeller 104 and rotor assembly 140 enables pressurization of bearing assembly 138 without requiring a separate pump.

Figure 4:
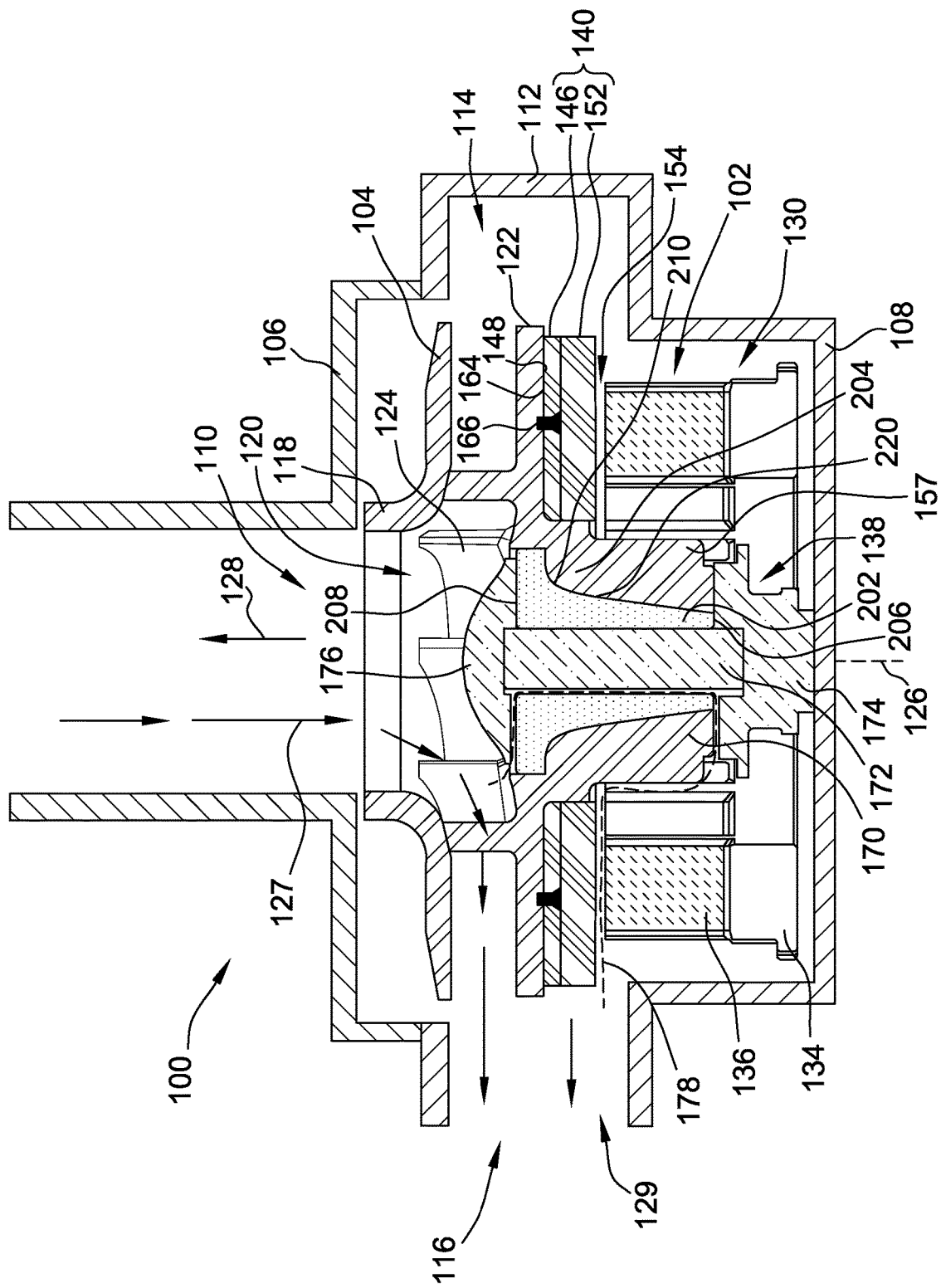
FIG. 4 a cross-sectional view of an alternative centrifugal pump assembly including an impeller, an electric motor, and a hydrodynamic bearing.

FIG. 4 illustrates an alternative embodiment of a centrifugal pump assembly 200. Centrifugal pump assembly 200 is substantially similar to centrifugal pump assembly 100 (shown in FIG. 1) in operation and composition, with the exception that centrifugal pump assembly 200 includes an alternative rotating component 202 in bearing assembly 138, rather than rotating component 170 (shown in FIG. 1). Furthermore, centrifugal pump assembly 200 includes an alternative extension portion 204 of impeller 104, rather than extension portion 157 (shown in FIG. 1). As such, components shown in FIG. 3 are labeled with the same reference numbers used in FIG. 1.

Figure 5:
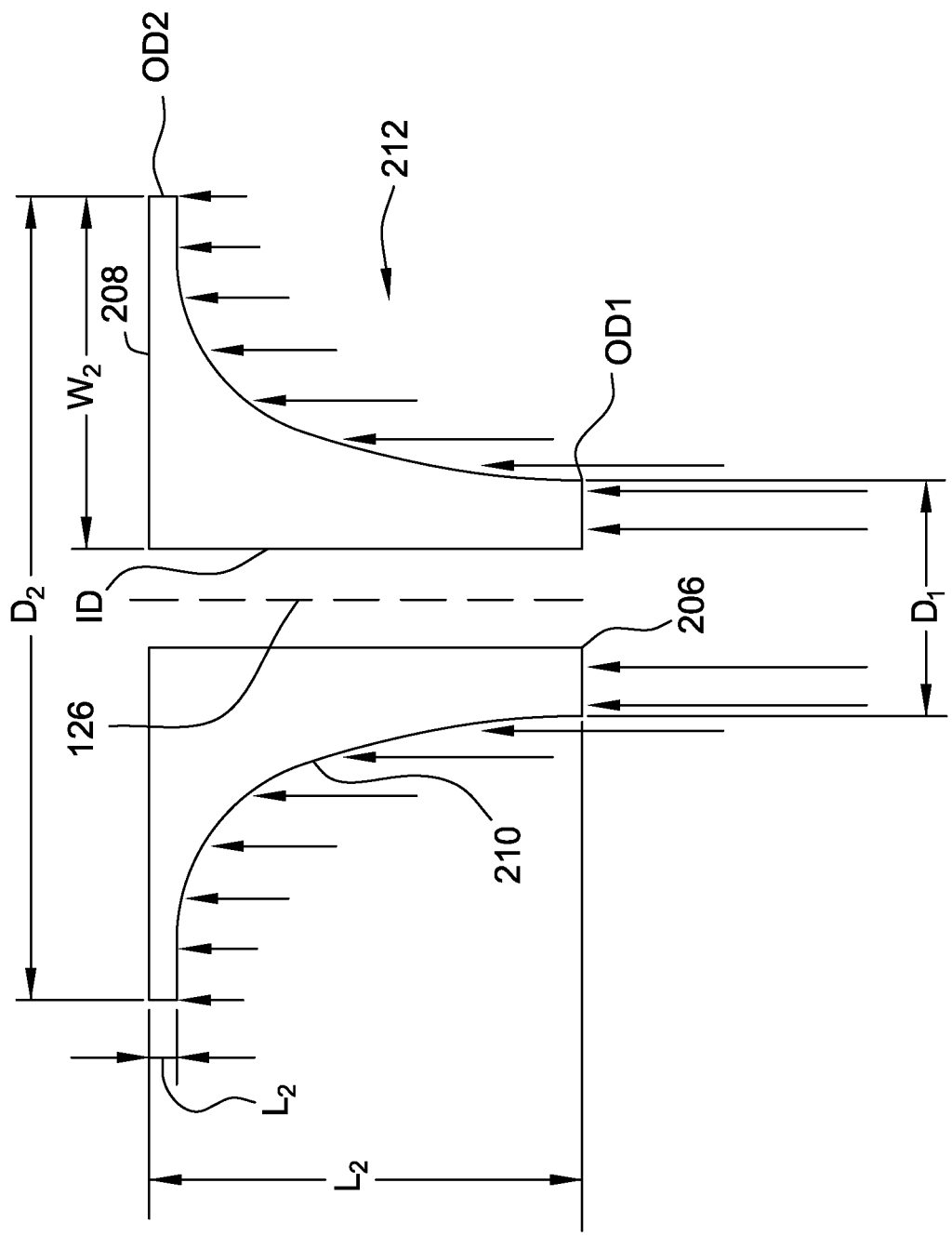
FIG. 5 is a cross-sectional view of a rotating component of the alternative hydrodynamic bearing shown in FIG. 4.
Figure 6:
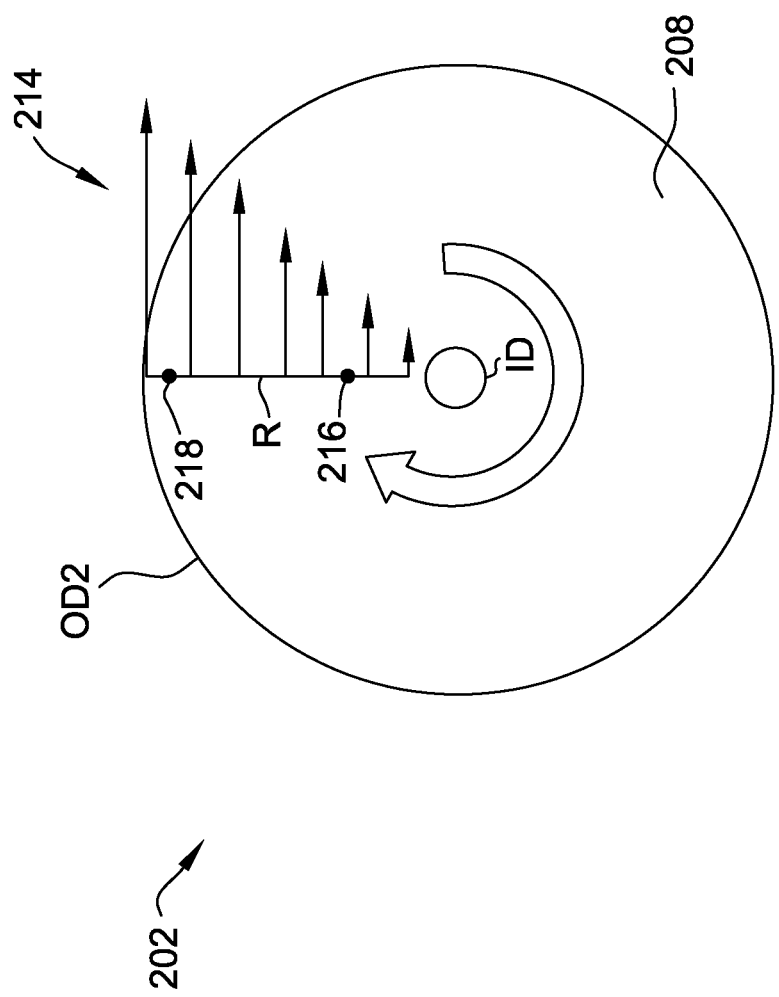
FIG. 6 is an axial end view of an end surface of the rotating component illustrating a velocity profile of the rotating component of the hydrodynamic bearing assembly shown in FIG. 5.

FIG. 5 is a cross-sectional view of rotating component 202 of bearing assembly 138, and FIG. 6 is an axial end view of an end surface of rotating component 202 illustrating a velocity profile of rotating component 202.

In the embodiment, to ensure bearing lift, bearing assembly 138 is designed to have a pressure velocity (PV) factor to fall within a predetermined range. The PV factor is based on the velocity of rotating component 202 and the coefficient of friction between rotating component 202 and second stationary component 176. However, as shown in FIG. 6, the circular shaped of rotating component 202 leads to a velocity differential between the inner diameter and the outer diameter of the disk rotating component 202. In at least some known bearing assemblies, this velocity differential may lead to a wide range of PV factors along the radius, at least some of which may be outside the desired range. However, as described herein, rotating component 202 of bearing assembly 138 includes a shape that causes each point along a radius of rotating component 202 to have the same PV factor as every other point along the radius.

As shown in FIG. 5, rotating component 202 includes a first end surface 206, an opposing second end surface 208 and a body surface 210 extending therebetween. Body surface 210 includes the radially outer surface of rotating component 202 along at least a portion of the axial length of rotating component 202. First end surface 206 includes a first diameter D1 and second end surface 208 includes a second diameter D2 that is greater than first diameter D1. Furthermore, rotating component 202 includes an inner diameter ID that is the same at both of end surfaces 206 and 208. However, rotating component 202 includes a first outer diameter OD1 at first end surface 206 and a second outer diameter OD2 at second end surface 208 such that second outer diameter OD2 is radially offset from first outer diameter OD1. As such, first end surface 206 includes a first width W1 between inner diameter ID and first outer diameter OD1. Similarly, second end surface 208 includes a second width W2 between inner diameter ID and second outer diameter OD2, wherein second width W2 is greater than first width W1. Additionally, both inner diameter ID and first outer diameter OD1 have a first axial length L1, whereas second outer diameter OD2 includes a second axial length L2 that is less than first axial length L1.

As shown in FIG. 4, second end surface 208 is positioned adjacent second stationary component 176, and first end surface 206 is positioned adjacent first stationary component 174. Alternatively, first end surface 206 is positioned adjacent second stationary component 176, and second end surface 208 is positioned adjacent first stationary component 174. Furthermore, in the embodiment, rotating component 202 is a single integral piece. In another embodiment, rotating component 202 is multiple pieces coupled together.

As can be seen, the shape of body surface 210 causes rotating component 202 to have a diameter that changes based on a location along the axial length of rotating component 202. The changing diameter causes a distributed force, illustrated by arrows 212, along first end surface 206 and body surface 210. Arrows indicate that as the diameter of rotating component 202 increases along axis 126, less axial force is imparted to rotating component 202 such that more force is imparted to rotating component proximate first end surface 206 than proximate second end surface 208. As shown in FIG. 4, body surface 210 includes a non-linear surface extending between first end surface 206 and second end surface 208. More specifically, body surface 210 includes a continuously curved surface.

Figure 7:
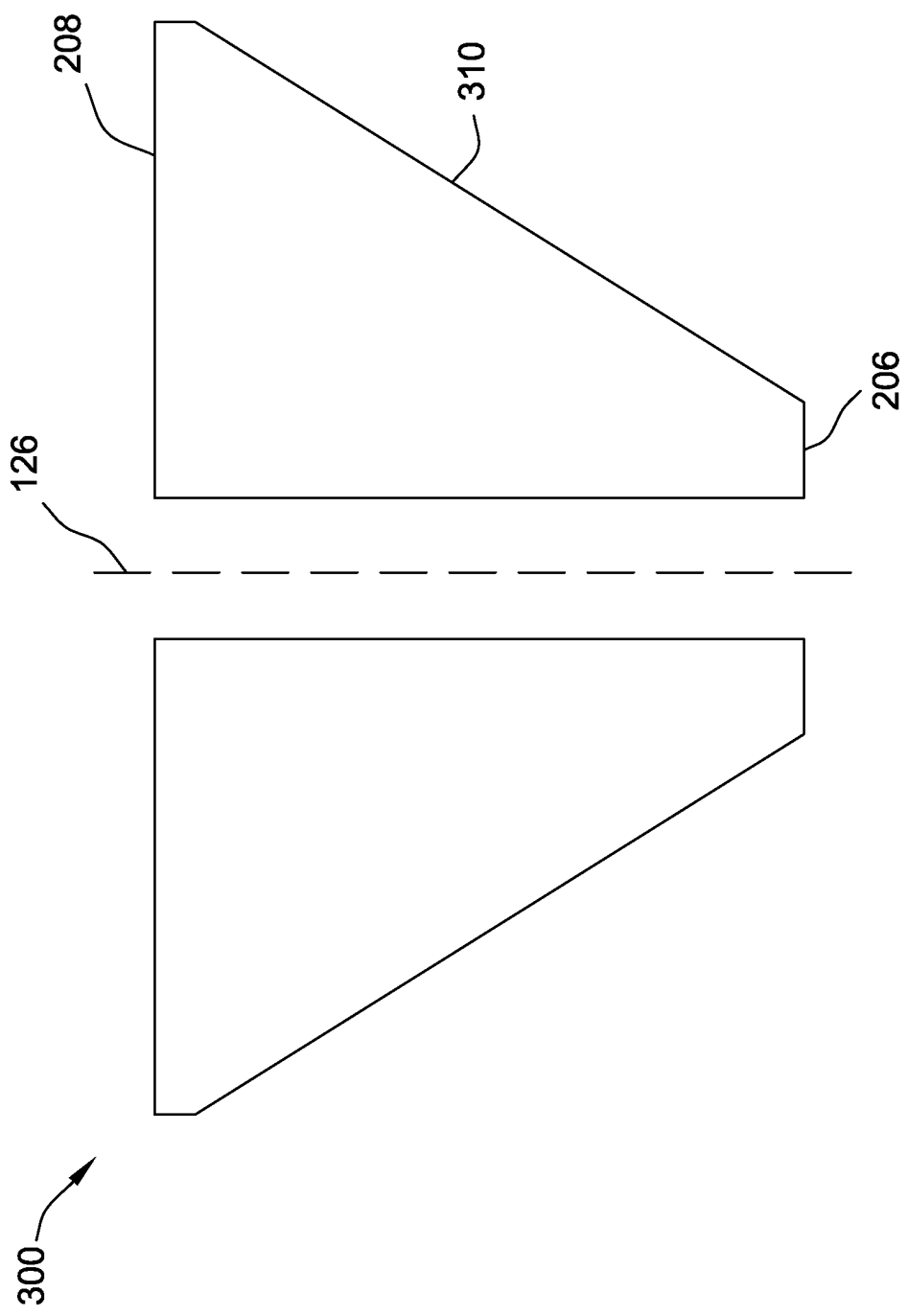
FIG. 7 is an alternative rotating component that may be used with the alternative hydrodynamic bearing assembly shown in FIG. 4.

FIG. 7 is an alternative rotating component 300 that may be used with hydrodynamic bearing assembly 138 shown in FIG. 4. As shown in FIG. 7, rotating component 300 includes a body surface 310 that linearly extends between first end surface 206 and second end surface 208. In such an embodiment, linear body surface 310 is oriented obliquely with respect to rotational axis 126. As shown in FIG. 7, linear body surface 310 also includes a constant slope between first end surface 206 and second end surface 208.

Figure 8:
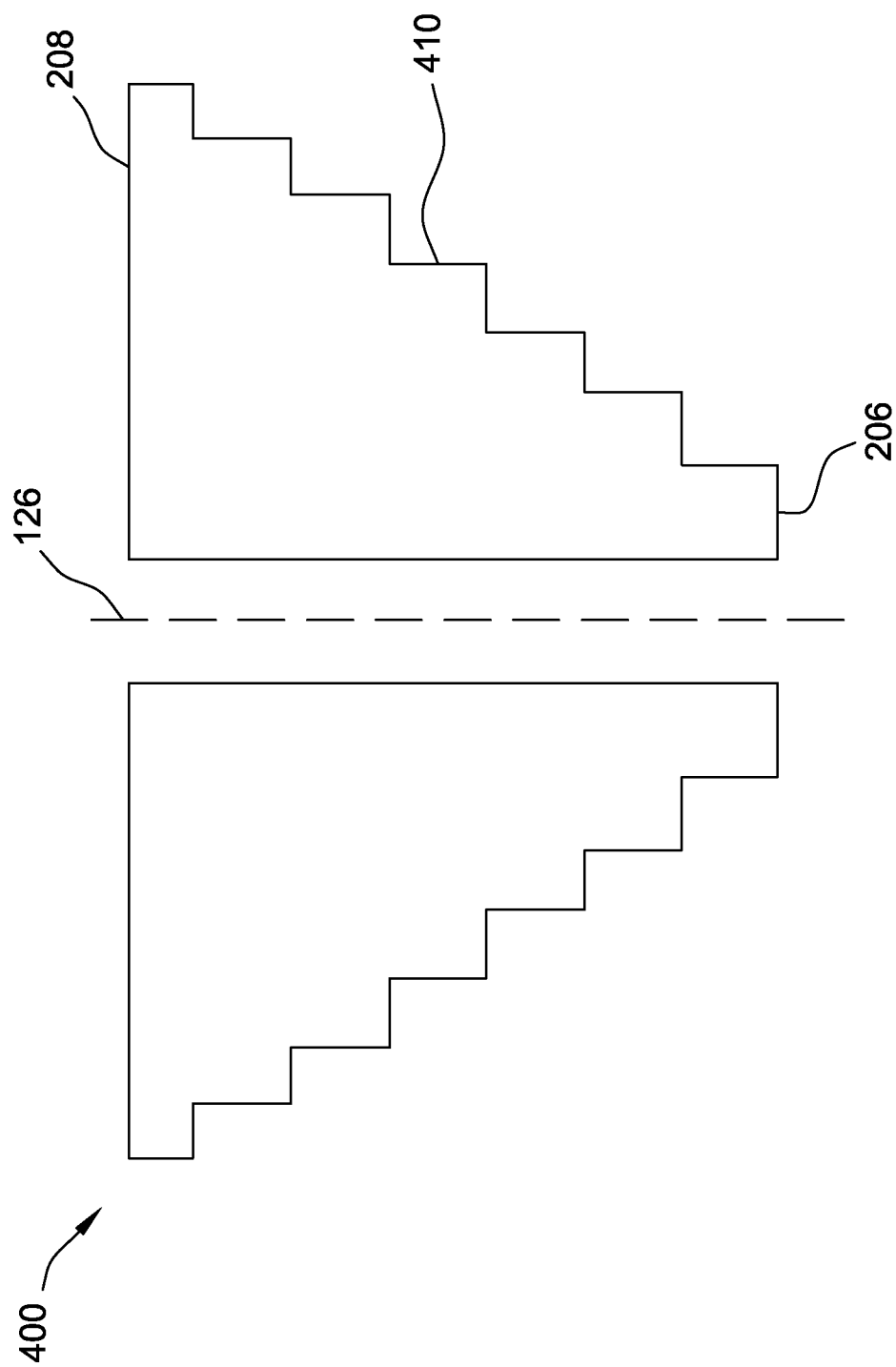
FIG. 8 is another alternative rotating component that may be used with the alternative hydrodynamic bearing assembly shown in FIG. 4.
Figure 9:
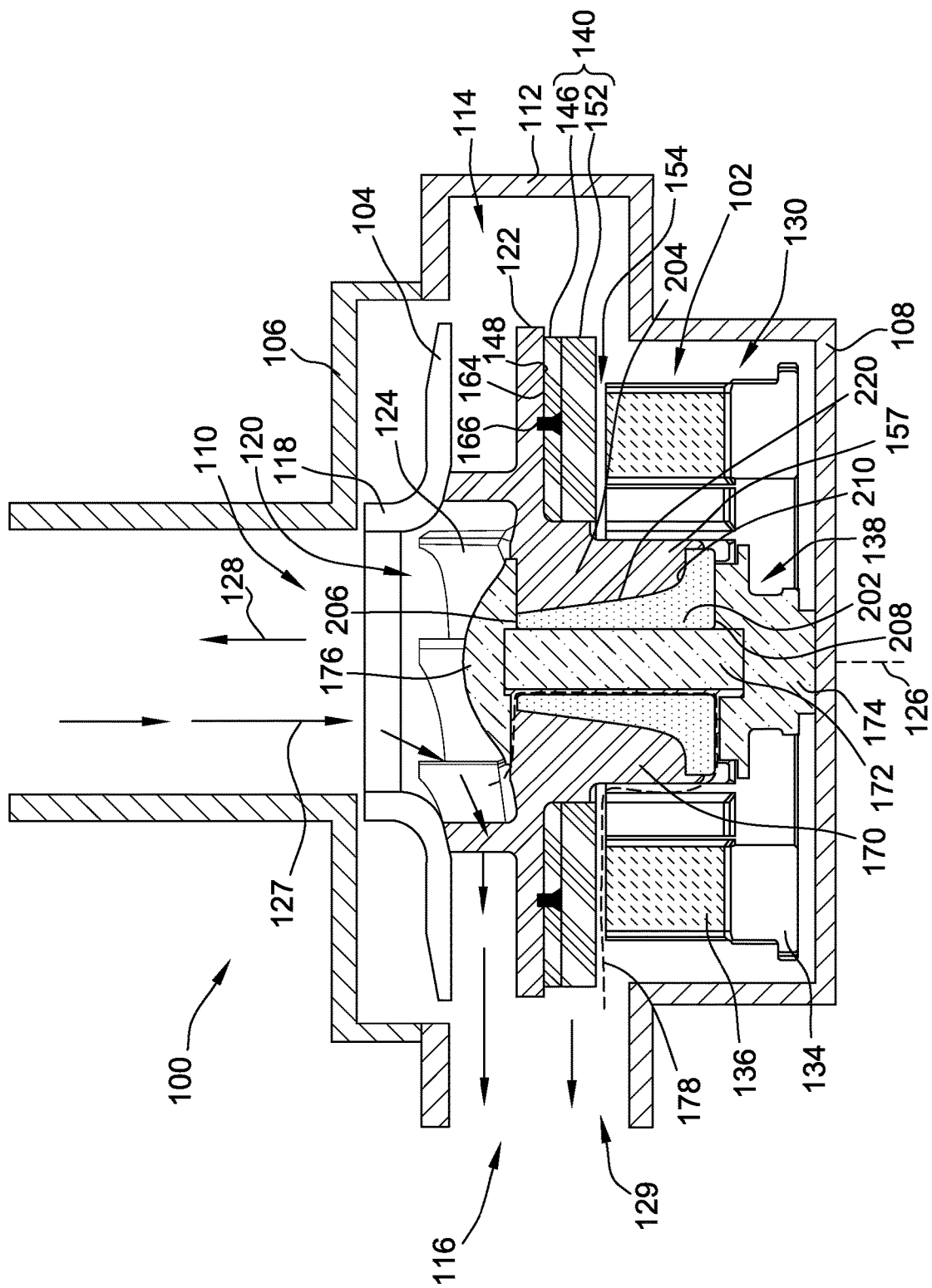
FIG. 9 is a cross-sectional view of another alternative centrifugal pump assembly including an impeller, an electric motor, and a hydrodynamic bearing.

FIG. 8 is another alternative rotating component 400 that may be used with hydrodynamic bearing assembly 138 shown in FIG. 4. As shown in FIG. 8, rotating component 400 includes a stepped body surface 410 that extends between first end surface 206 and second end surface 208. Generally, body surface 210 of rotating component 202 is any of non-linear, linear, stepped, or any combination thereof that facilitates operation of rotating component 202 as described herein.

Referring back to FIG. 6, second end surface 208 defines a radius R between inner diameter ID and second outer diameter OD2. A graduated velocity of rotating component 202 is illustrated by arrows 214 on second end surface 208. The graduated velocity 214 of rotating component 202 illustrates that points along radius R nearer to inner diameter ID move slower than points along radius R nearer to second outer diameter OD2, where the velocity along radius R is indicated by the length of arrows 214. The graduated distributed force 212 over rotating component 202 caused by varying the diameter with the length compensate for the graduated velocity 214 along radius R. Such a configuration results in an optimal, narrower, PV factor range over radius R of second end surface 208. More specifically, the PV factor of rotating component 202 is substantially similar at each point along radius R. Even more specifically, second end surface 208 includes a first point 216 a first distance D1 from midpoint or axis 126 of surface 208. Rotating component 202 includes a first PV factor at first point 216. Similarly, second end surface 208 includes a second point 218 a second distance D2 from midpoint or axis 126 of surface 208. Rotating component 202 includes a second PV factor at second point 218. As described herein, the first and second PV factors at first and second points 216 and 218 along radius R are substantially similar to each other despite the graduated velocity of rotating component 202 because of the varying the diameter over the axial length of rotating component 202. A substantially constant PV factor across end surface 208 leads to more efficient operation of bearing assembly 138 and an increased service lifetime of rotating component 202 and stationary components 174 and 176.

Referring back to FIG. 4, impeller 104 includes extension portion 204 that extends axially from rear plate 122 towards motor housing 108 and is coupled to rotating component 202 of bearing assembly 138. Extension 204 includes a radially inner surface 220 that corresponds in shape to the shape of body surface 210 of rotating component 202. That is, in embodiments where body surface 210 is curved, as shown in FIG. 4, inner surface 220 is also correspondingly curved. Generally, radially inner surface 220 is any shape that matches, or corresponds, to the shape of body surface 210 to facilitate operation of assembly 200 as described herein.

In operation, conductor coils 136 coupled to stator core 134 are energized in a chronological sequence that provides an axial magnetic field which moves clockwise or counterclockwise around stator core 134 depending on the predetermined sequence or order in which conductor coils 136 are energized. This moving magnetic field intersects with the flux field created by the plurality of permanent magnets 152 to cause rotor assembly 140 to rotate about axis 126 relative to stator assembly 130 in the desired direction. As described herein, because rotor disk 146 is directly coupled to impeller 104, rotation of rotor disk 146 causes rotation of impeller 104, which pressurizes the fluid flowing through impeller 104 from inlet 120 to outlet 116. The resulting pressure differential across impeller 104, and rotor assembly 140, and locating channel inlet 180 on positive pressure side 129 and channel outlet 182 on negative pressure side 127 of impeller 104 forces fluid through flow channel 178. The fluid through channel 178 pressurizes bearing assembly 138 and overcomes the axial magnetic force between stator assembly 130 and rotor assembly 140 to enable operation of assembly 100 as described herein.

The apparatus, methods, and systems described herein provide a pump assembly having an electric motor coupled to an impeller. More specifically, a rotor assembly of the motor is directly coupled to the impeller. The impeller includes an inlet and an outlet and is configured to direct a fluid therebetween and is also coupled to a rotating component of a bearing assembly. A fluid flow channel is defined between the rotating component and at least one stationary component of the bearing assembly. The flow channel includes an inlet proximate the impeller outlet and an outlet proximate the impeller inlet. As described herein, because the rotor disk is directly coupled to the impeller, rotation of the rotor disk causes rotation of the impeller, which pressurizes the fluid flowing from the impeller inlet to the impeller outlet. The resulting pressure differential across the impeller combined with locating the channel inlet on the positive pressure side of the impeller and locating the channel outlet on the negative pressure side of the impeller forces fluid through the flow channel. The fluid through the flow channel pressurizes the bearing assembly to enable operation of assembly 100 as described herein without requiring a separate pump.

Furthermore, tapering the diameter of the rotating component of the bearing assembly over its length to have a graduated distributed force compensates for the graduated velocity along the radius of the rotating component's end surface. Such a configuration results in an optimal, narrower, PV factor range over the radius the end surface. A substantially constant PV factor across the rotating component end surface leads to more efficient operation of the bearing assembly and an increased service lifetime of its rotating and stationary components.

Exemplary embodiments of the centrifugal pump assembly are described above in detail. The centrifugal pump assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hydrodynamic bearing assembly configured to rotating about an axis, said hydrodynamic bearing assembly comprising:
   a first stationary component;
   a shaft coupled to said first stationary component;
   a second stationary component coupled to said shaft opposite said first stationary component; and
   a rotating component coupled to said shaft between said first stationary component and said second stationary component, wherein said rotating component comprises a first end surface including a first diameter and an opposing second end surface including a second diameter greater than said first diameter, wherein said rotating component comprises a body surface extending between said first end surface and said second end surface, wherein said body surface is non-linear arid comprises a curved surface.

2. The hydrodynamic bearing assembly in accordance with claim 1, wherein said second end surface is positioned adjacent said second stationary component, and wherein said first end surface is positioned adjacent said first stationary component.

3. The hydrodynamic bearing assembly in accordance with claim 1, wherein said first end surface is positioned adjacent said second stationary component, and wherein said second end surface is positioned adjacent said first stationary component.

4. The hydrodynamic bearing assembly in accordance with claim 1, wherein said second end surface comprises a midpoint and an outer diameter that define a radius therebetween, wherein a pressure velocity factor at a first point a first distance from said midpoint along said radius is equal to a pressure velocity factor of a second point a second distance from said midpoint along said radius, wherein said second end surface is substantially flat and oriented perpendicular to the axis.

5. The hydrodynamic bearing assembly in accordance with claim 1, wherein said second end surface comprises a midpoint and an outer diameter that define a radius therebetween, wherein a pressure velocity factor of said rotating component is substantially similar at each point along said radius, wherein said second end surface is substantially flat and oriented perpendicular to the axis.

6. The hydrodynamic bearing assembly in accordance with claim 1, wherein said first end surface is concentric with said second end surface.

7. The hydrodynamic bearing assembly in accordance with claim 1, wherein said first end surface comprises a first inner diameter, and wherein said second end surface comprises a second inner diameter equal to said first inner diameter.

8. A pump assembly comprising:
a hydrodynamic bearing assembly comprising:
a first stationary component;
a shaft coupled to said first stationary component;
a second stationary component coupled to said shaft opposite said first stationary component; and
a rotating component coupled to said shaft between said first stationary component and said second stationary component, wherein said rotating component comprises a first end surface including a first diameter and an opposing second end surface including a second diameter greater than said first diameter, wherein said rotating component comprises a body surface extending between said first end surface and said second end surface, wherein said body surface is non-linear and comprises a curved surface;
an impeller coupled to said rotating component; and
a rotor assembly directly coupled to said impeller.

9. The pump assembly in accordance with claim 8, wherein said second end surface is positioned adjacent said second stationary component, and wherein said first end surface is positioned adjacent said first stationary component.

10. The pump assembly in accordance with claim 8, wherein said first end surface is positioned adjacent said second stationary component, and wherein said second end surface is positioned adjacent said first stationary component.

11. The pump assembly in accordance with claim 8, wherein said second end surface comprises a midpoint and an outer diameter that define a radius therebetween, wherein a pressure velocity factor at a first point a first distance from said midpoint along said radius is equal to a pressure velocity factor of a second point a second distance from said midpoint along said radius, wherein said second end surface is substantially flat and oriented perpendicular to the axis.

12. The pump assembly in accordance with claim 8, wherein said second end surface comprises a midpoint and an outer diameter that define a radius therebetween, wherein a pressure velocity factor of said rotating component is the same at each point along said radius, wherein said second end surface is substantially flat and oriented perpendicular to the axis.

13. The pump assembly in accordance with claim 8, wherein said impeller comprises a rear plate and an extension portion extending along said rotating component from said rear plate.

14. The pump assembly in accordance with claim 13, wherein said extension portion comprises a radially inner surface that corresponds in shape to said radially outer body surface of said rotating assembly.

15. The pump assembly in accordance with claim 8, wherein said first end surface is concentric with said second end surface.

16. The pump assembly in accordance with claim 8, wherein said first end surface comprises a first inner diameter, and wherein said second end surface comprises a second inner diameter equal to said first inner diameter.

* * * * *